United States Patent
Lin et al.

(10) Patent No.: US 12,540,918 B2
(45) Date of Patent: Feb. 3, 2026

(54) SENSING DEVICE AND SENSING METHOD

(71) Applicant: National Tsing Hua University, Hsinchu (TW)

(72) Inventors: Zong-Hong Lin, Hsinchu (TW); Snigdha Roy Barman, Hsinchu (TW); Kuan-Ming Lee, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 360 days.

(21) Appl. No.: 18/169,420

(22) Filed: Feb. 15, 2023

(65) Prior Publication Data

US 2024/0068987 A1 Feb. 29, 2024

(30) Foreign Application Priority Data

Aug. 26, 2022 (TW) .................................. 111132336

(51) Int. Cl.
*G01N 27/42* (2006.01)
*B25J 15/00* (2006.01)

(52) U.S. Cl.
CPC ............ *G01N 27/42* (2013.01); *B25J 15/0009* (2013.01)

(58) Field of Classification Search
CPC ...... G01N 27/42; B25J 15/0009; B25J 13/084
See application file for complete search history.

(56) References Cited

U.S. PATENT DOCUMENTS

| 8,781,631 B2 | 7/2014 | Li et al. |
| 2018/0263539 A1* | 9/2018 | Javey .................. A61B 5/1477 |
| 2023/0069677 A1* | 3/2023 | Mcdonagh ................ B03C 3/12 |

(Continued)

FOREIGN PATENT DOCUMENTS

| CN | 111912881 A | 11/2020 |
| TW | 201247374 A | 12/2012 |

OTHER PUBLICATIONS

Pal et al., A highly sensitive mercury ion sensor based on solid-liquid contact electrification, ECS Journal of Solid state science and Technology, 2020, 9, 115029 (Year: 2020).*

(Continued)

*Primary Examiner* — Luan V Van
*Assistant Examiner* — Shizhi Qian
(74) *Attorney, Agent, or Firm* — The Webb Law Firm

(57) ABSTRACT

A sensing device includes a robotic hand, an electrode and a triboelectric sensing layer. The robotic hand includes at least one robot finger. One robot finger is integrated with an electrode layer which is functionalized with a triboelectric sensing layer. The triboelectric sensing layer is composed of plurality of nanostructures including Tellurium. The robot hand with triboelectric sensing layer undergoes contact and separation with the target analyte solution having mercury ions which leads to the formation of mercury telluride owing to the highly selective between of mercury ions to the Tellurium surface. After contacting with the target analyte, the electron transfer ability of the nanostructures attached to robot finger is altered. This process of contact electrification causes the induction of electrons to the electrode layer generating the triboelectric output voltage. The triboelectric output voltage is utilized to determine the concentration of mercury ions in the target analyte solution.

6 Claims, 15 Drawing Sheets

(56) References Cited

U.S. PATENT DOCUMENTS

2023/0296471 A1* 9/2023 Jiao .................... G01M 5/0066
73/658

OTHER PUBLICATIONS

Chen et al., Highly sensitive solid-liquid interfacing triboelectric nanosensor for self-powered mercury ion detection, ECS Meeting abstract, vol. MA 2019-01, 1341, 2019 (Year: 2019).*
Amit et al., Point-of-use robotic sensors for simultaneous pressure detection and chemical analysis, Materials Horizons, 2019, 6, 604 (Year: 2019).*
Qu et al., Artificial tactile perception smart finger for material identification based on triboelectric sensing, Science Advances, 2022, 8, eabq2521 (Year: 2022).*
Zhu et al., A soft robotic finger with self-powered triboelectric curvature sensor based on multi-material 3D printing, Nano Energy, 2020, 73, 104772 (Year: 2020).*
Tsao et al., A self-powered mercury ion nanosensor based on the thermoelectric effect and chemical transformation mechanism, Nano Energy, 2019, 62, 268-274 (Year: 2019).*
Barman et al., "Triboelectric Nanosensor Integrated with Robotic Platform for Self-Powered Detection of Chemical Analytes", ACS Nano, 2023, pp. 2689-2701, vol. 17.

* cited by examiner

SENSING DEVICE AND SENSING METHOD

CROSS REFERENCE TO RELATED APPLICATIONS

This application claims priority to Taiwanese Patent Application No. 111132336, filed Aug. 26, 2022, the disclosure of which is hereby incorporated by reference in its entirety.

BACKGROUND OF THE INVENTION

Field of the Invention

The present disclosure relates to a sensing device and a sensing method. More particularly, the present disclosure relates to a sensing device and a sensing method for a chemical analyte.

Description of Related Art

Internet of things (IoT) has contributed to the advancement of the living standards by transforming the daily activities into parts of intelligent system. Due to its compelling characteristics, IoT has been applied to various fields especially in the fields of healthcare, environmental sensing and security. Recently, the concept of IoT has been applied to the field of robotics to develop robotic platforms which can function and provide feedbacks in real-time in order to implement an effective decision. These improvements pave the way for the development of humanoid robots to mimic the sensation of human beings especially touching and sensing.

Biological and chemical threats are still a globally major concern of sampling and sensing materials in a dangerous environment. Thus, it is indispensable to develop a sensing robot for detecting the level of hazardous chemical analyte in the surrounding environment. However, because of the high power consumption, the development is still at the early stage. Using battery makes the devices bulky and causes environmental problems, which usually shortens the lifetime of the devices, limiting its durability, portability and safety of a wearable sensing device. Although there are various chemical sensing methods, it is hard to integrate the existing methodologies with the robotic systems. Thus, the invention of robotic chemical sensors which can mimic the function of touching and sensing of human beings is important to these developments. As a result, a next generation self-powered chemical sensor is urgently needed to be developed so that the chemical sensor can analyze the surrounding environment by itself and reduce the component of human-interference.

The triboelectric nanogenerator (TENG) has been developed as a clean and renewable technology which can convert the mechanical energy to the electric energy. TENG depends on the phenomenon of contact electrification and electrostatic induction which causes the two materials to contact with each other and produces surface charges by friction. Until now, a solid-solid triboelectric nanosensor (TENS) for detection of various chemical analytes and biological molecules has been reported. However, producing the solid-solid TENS brings several challenges including long term stability, lifetime and sensitivity.

To overcome these challenges, developers try to use liquids as the contact materials in TENS because the liquids can be obtained easily, and are abundant, economical and inexhaustible. Moreover, the liquid layer can be used as a strong lubricant to realize a stable interaction and improve a reliability of the sensor. Thus, a solid-liquid TENS (S-L TENS) is a promising alternative of building a self-powered and stable nanosensor for chemical sensing.

Recently, TENG based on solid-liquid contact electrification has been studied for harvesting energy, but only few researchers reported TENG based on solid-liquid contact electrification for the detection of chemical analytes. The highly automatic and self-powered chemical sensor can perform the rapid on-site detection of the analytes without placing the human user at the risk of contamination and be useful for environmental monitoring and safety application. However, the integration of the chemical sensor with the automated robot is limited by poor selectivity and sensitivity, and further improvement is crucially needed.

SUMMARY OF THE INVENTION

According to one aspect of the present disclosure, a sensing device includes a robotic hand, an electrode and a triboelectric sensing layer. The robotic hand includes at least one robot finger. The electrode is attached to a surface of the at least one robot finger. The triboelectric sensing layer is functionalized onto the electrode and includes a plurality of nanostructures, wherein each of the nanostructures includes Tellurium, and the triboelectric sensing layer undergoes electron transfer with a target analyte solution upon contact. The nanostructures including Tellurium chemically react with mercury ions of the target analyte solution to form mercury telluride nanostructures which alter the electron transferring capability of the triboelectric sensing layer and in turn change a triboelectric output voltage.

According to another aspect of the present disclosure, a sensing method includes a sensing step and a triboelectric output voltage generating step. In the sensing step, at least one robot finger contacts at least one target analyte solution, an electrode is attached to the at least one robot finger and a triboelectric sensing layer is functionalized onto the electrode, the triboelectric sensing layer of the at least one robot finger includes a plurality of nanostructures, each of the nanostructures includes Tellurium, the chemical reaction between the nanostructures including Tellurium attached to the at least one robot finger and mercury ions upon contact leads to the formation of mercury telluride nanostructures which alter the electron transferring capability of the triboelectric sensing layer. In the triboelectric output voltage generating step, a triboelectric output voltage is generated by a contact electrification via contact and separation between the triboelectric sensing layer attached to the at least one robot finger and the at least one target analyte solution, or between the triboelectric sensing layer and a contact liquid after the triboelectric sensing layer contacting and separating from the at least one target analyte solution. The contact electrification combined with the electrostatic induction generates the triboelectric output voltage. The triboelectric output voltage is provided for calculating a concentration of the mercury ions of the at least one target analyte solution.

BRIEF DESCRIPTION OF THE DRAWINGS

The present disclosure can be more fully understood by reading the following detailed description of the embodiment, with reference made to the accompanying drawings as follows.

DESCRIPTION OF THE INVENTION

Figure 1:
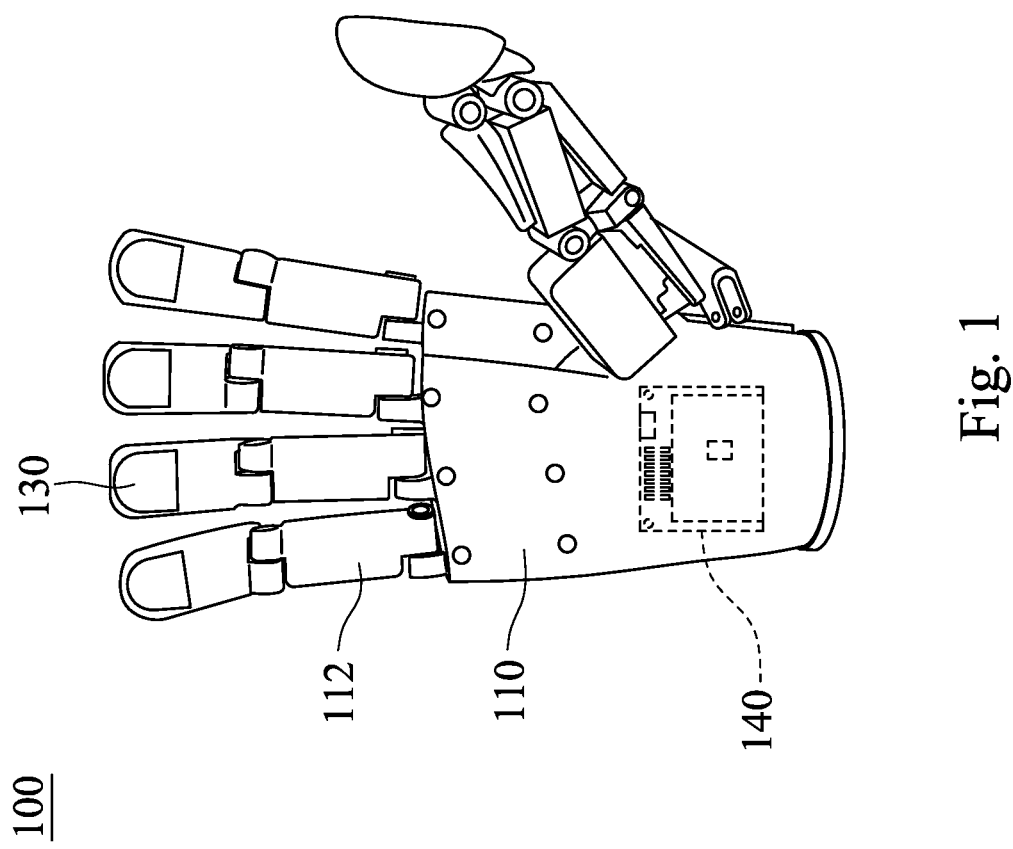
FIG. 1 shows a schematic view of a sensing device according to an embodiment of the present disclosure.
Figure 2:
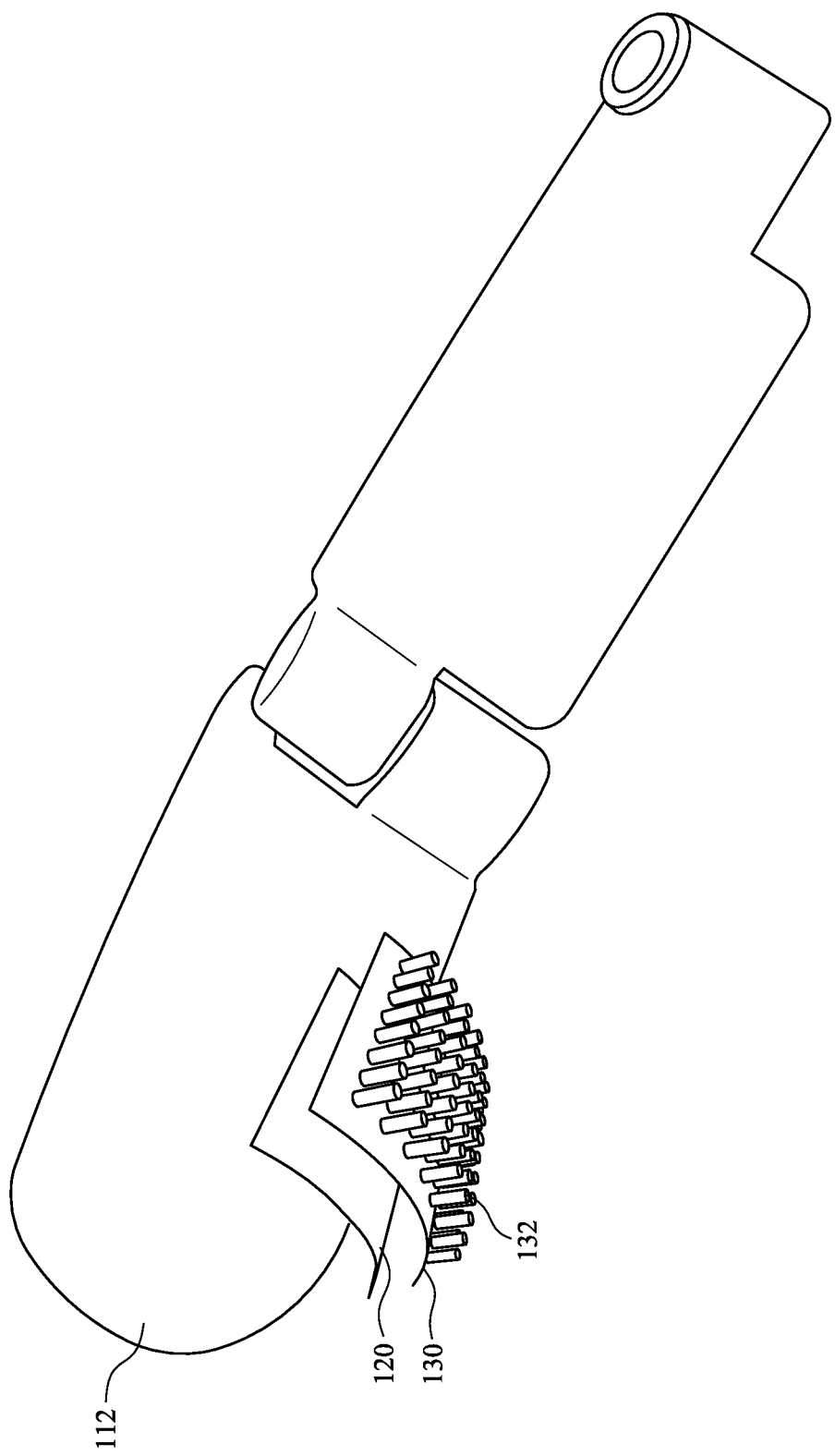
FIG. 2 shows a detailed schematic illustration of a part of the sensing device according to the embodiment in FIG. 1.
Figure 3:
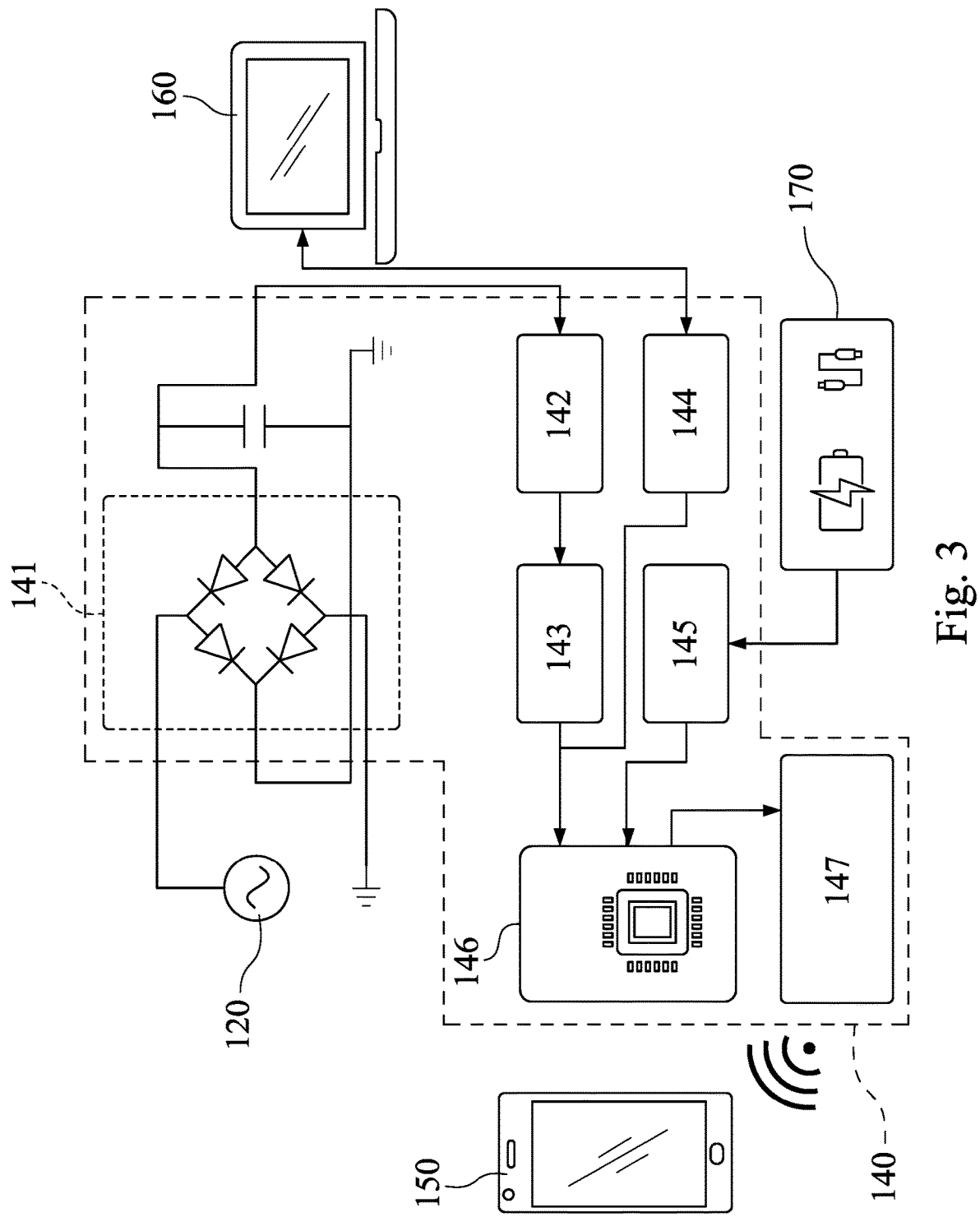
FIG. 3 shows a block diagram of the voltage signal collection, processing and wireless transmission of the sensing device according to the embodiment in FIG. 1.

FIG. 1 shows a schematic view of a sensing device 100 according to an embodiment of the present disclosure. FIG. 2 shows a detailed schematic illustration of a part of the sensing device 100 according to the embodiment in FIG. 1. FIG. 3 shows a block diagram of the voltage signal collection, processing and wireless transmission of the sensing device 100 according to the embodiment in FIG. 1. As shown in FIGS. 1 to 3, the sensing device 100 includes a robotic hand 110, an electrode 120, a triboelectric sensing layer 130 and a circuit board 140. The robotic hand 110 includes at least one robot finger 112. One electrode 120 is attached to the surface of one robot finger 112. Each electrode 120 is functionalized with a triboelectric sensing layer 130 which includes a plurality of nanostructures including Tellurium (Tellurium nanostructures 132). The contact between the triboelectric sensing layer 130 and the target analyte solution results in electron transfers which generate the electrical output signal. Moreover, the triboelectric sensing layer 130 mounted to the robot finger 112 is further employed for contacting other commonly used solvents such as deionized water 180 (shown in FIGS. 4A to 4C) or an organic solvent to generate a triboelectric output voltage. Upon contact, Tellurium undergoes a chemical reaction with mercury ions of the target analyte solution to form mercury telluride such that the electron transferring capability is altered compared to the bare Tellurium surface which further changes the triboelectric output voltage. The circuit board 140 can be integrated at a back side, an inner side, or other positions of the robotic hand 110, and electrically connected to the electrode 120.

Specifically, the triboelectric sensing layer 130 is composed of array of Tellurium nanowires which is grown on the surface of the electrode 120, and the triboelectric sensing layer 130 is directly grown on the electrode 120 by a simple chemical reaction. Tellurium dioxide ($TeO_2$) and hydrazine monohydrate ($N_2H_4 \cdot H_2O$) are used as the precursor and reducing agent, respectively. The material of the electrode 120 can be aluminum, but the present disclosure is not limited thereto.

As shown in FIG. 3, the circuit board 140 includes a rectifier 141, an input-and-output port 142, an analog-to-digital converter 143, a serial peripheral interface 144, a voltage regulator 145, a microcontroller unit 146 and a transmission module 147. The rectifier 141 is electrically connected to the electrode 120 to convert the alternating currents (AC) output voltage generated due to the triboelectric effect to a direct current (DC) signal, and the analog-to-digital converter 143 converts the DC signal of the rectifier 141 input by the input-and-output port 142 from an analog form to a digital signal, and the digital signal is input to the microcontroller unit 146. The serial peripheral interface 144 is electrically connected to a host computer 160 and electrically connected between the analog-to-digital converter 143 and the microcontroller unit 146. The voltage regulator 145 is connected to an external power source 170 and provides an electric power to the microcontroller unit 146. The microcontroller unit 146 is configured to process the input digital signal, and transmit the triboelectric output voltage of the electrode 120 which is processed by the aforementioned electronic elements of the circuit boards 140 to a user device 150 by the transmission module 147, and the triboelectric output voltage is provided for a user to interpret a measurement result. The transmission module 147 can be a wireless transmission module, such as a blue-tooth with low-power consumption.

Figure 4C:
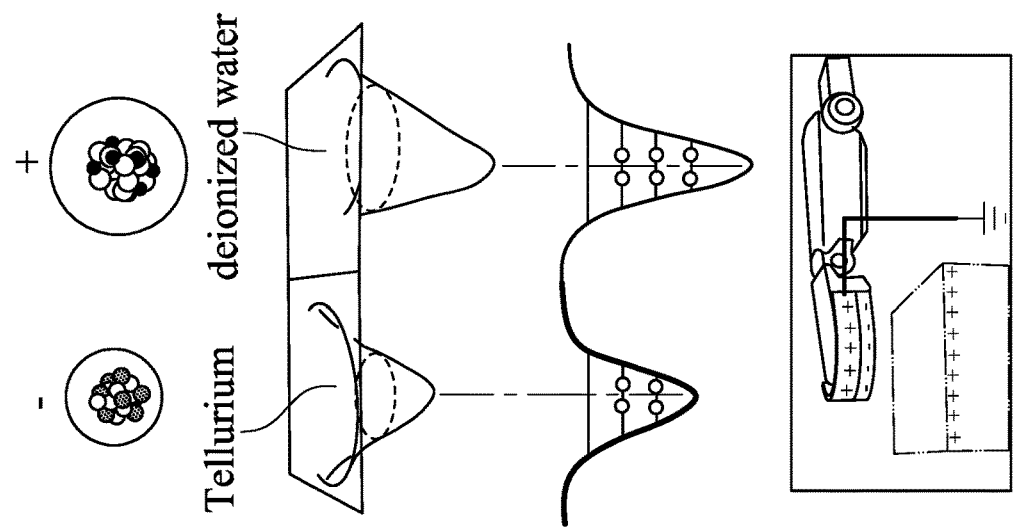
FIGS. 4A to 4C show a schematic view of a working principle of the sensing device according to the embodiment in FIG. 1 and the deionized water.
Figure 4B:
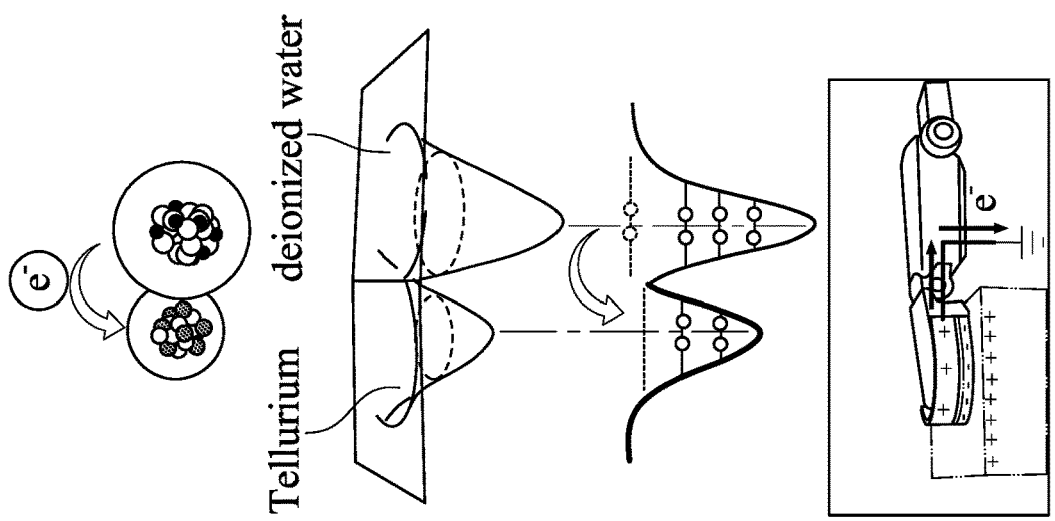
Figure 4A:
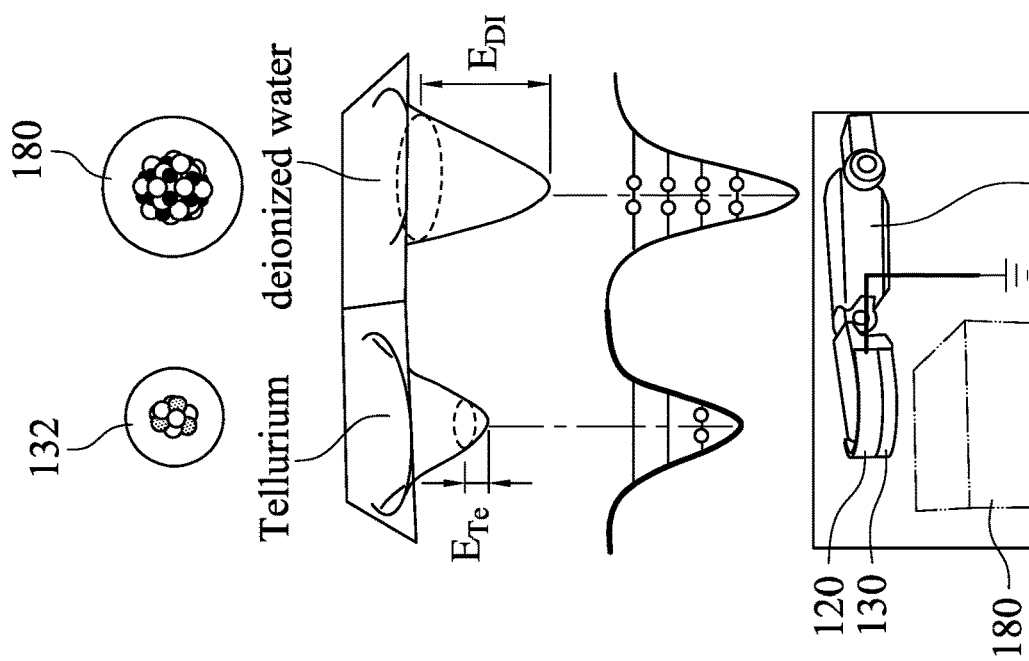

The principle that how the sensing device 100 generates the triboelectric output voltage is described as the following. Please refer to FIGS. 4A to 4C with FIG. 2. FIGS. 4A to 4C show a schematic view of a working principle of the sensing device 100 according to the embodiment in FIG. 1 and the deionized water 180. In an initial state as shown in FIG. 4A, the electron clouds of the Tellurium nanostructures 132 of the triboelectric sensing layer 130 are separated completely from electron clouds of the deionized water 180, and electrons cannot be transferred because of a high energy barrier between them. When an external mechanical force is applied (in FIG. 4B), surfaces of the Tellurium nanostructures 132 contact the deionized water 180, and their corresponding electron clouds overlap due to the decrease in the energy barrier. Because the highest energy level $E_{DI}$ of atoms in the deionized water 180 is higher than the highest energy level $E_{Te}$ of the Tellurium nanostructures 132, the electrons $e^-$ are transferred from the deionized water 180 to the surfaces of the Tellurium nanostructures 132. This results in the Tellurium nanostructures 132 based triboelectric sensing layer 130 to be negatively charged and the deionized water 180 to be positively charged. When the mechanical force is removed, the triboelectric sensing layer 130 tends to separate from the deionized water 180 which will break the electrical neutrality of the surface of the robot finger 112. Thus, electrons $e^-$ will be transferred from the electrode 120 to a ground to maintain the electrical neutrality of the surface of the robot finger 112, leading to the induction of positive charges on the electrode 120 and flow of current in the external circuit. Then, as shown in FIG. 4C, after the surface of the triboelectric sensing layer 130 is completely separated from the deionized water 180, the transferred electrons $e^-$ remain on the surfaces of the Tellurium nanostructures 132 as an electrostatic charge making the Tellurium nanostructures 132 and the deionized water 180 to be negatively and positively charged, respectively. Every time when the triboelectric sensing layer 130 contacts and then separates from the deionized water 180, the aforementioned process will occur once. Therefore, a series of triboelectric output voltages are generated by the periodic contact and separation between the triboelectric sensing layer 130 and the deionized water 180. The value of the triboelectric output voltage depends on an amount of the transferred electrons $e^-$ between the triboelectric sensing layer 130 and the deionized water 180.

Figure 5:
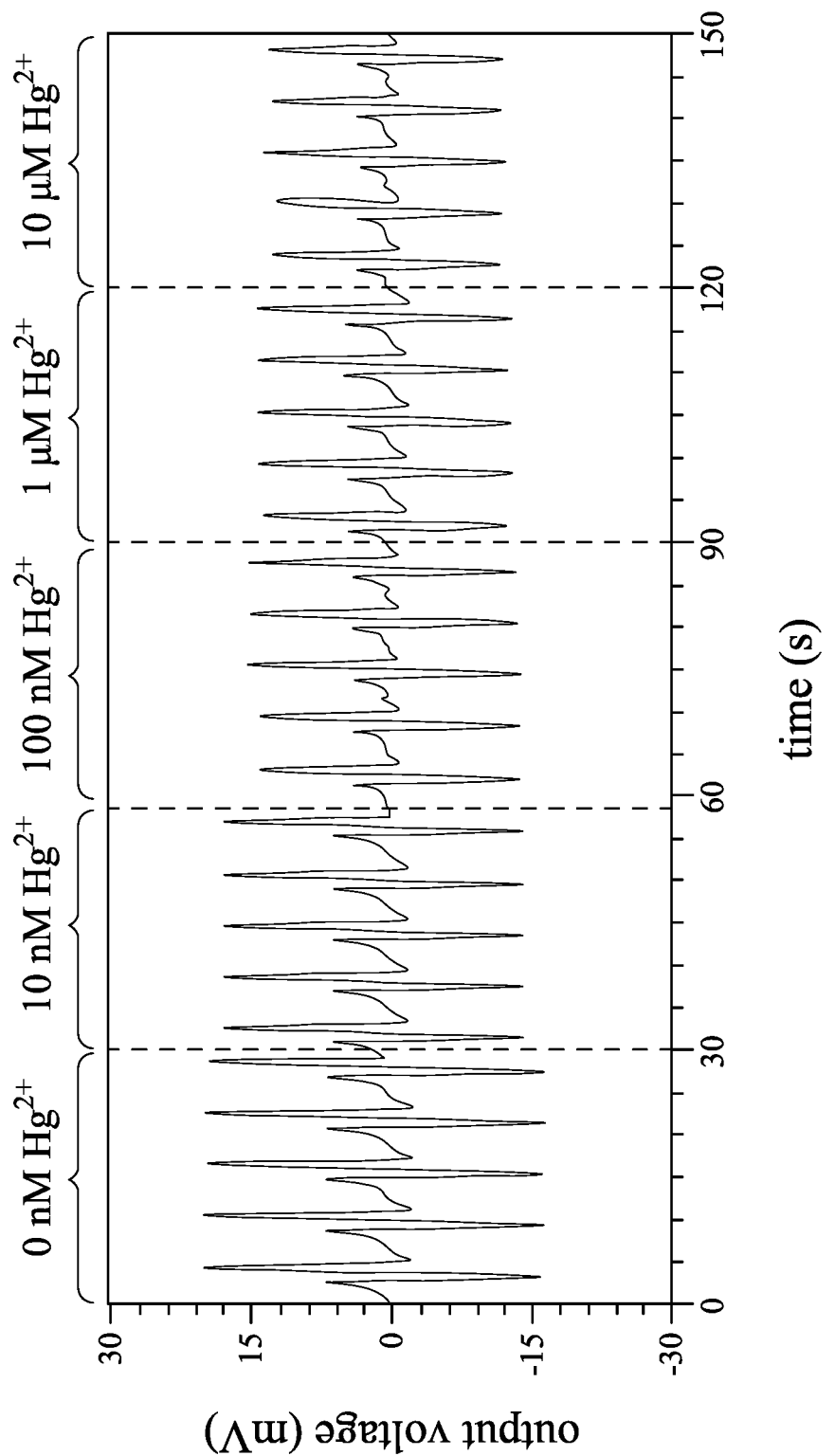
FIG. 5 shows the triboelectric output voltage of the sensing device according to the embodiment in FIG. 1 with the hydrophilic Tellurium nanostructures after contacting and separating from the deionized water.

FIG. 5 shows the triboelectric output voltage of the sensing device 100 according to the embodiment in FIG. 1 with the hydrophilic Tellurium nanostructures 132 after contacting and separating from the deionized water 180. The hydrophilic Tellurium nanostructures 132 are reacted with different concentrations of mercury ions ($Hg^{2+}$), and then undergo solid-liquid contact electrification with the deionized water 180. In the present embodiment, a mechanical oscillator is used to carry out periodic contact and separation between triboelectric sensing layer 130 and the deionized water 180 when the triboelectric sensing layer 130 is not disposed at the robot finger 112, but the present disclosure is not limited thereto. The Tellurium nanostructures 132 undergo the chemical reaction with the mercury ions to form mercury telluride nanostructures which alter the electron transferring capability of the triboelectric sensing layer 130. Upon contacting with the deionized water 180, electron transfer takes place between the Mercury Tellurium nanostructures and the deionized water 180 due to the process of contact electrification, that is, the electron transferring capability of the triboelectric sensing layer 130 is changed from a first electron transferring capability to a second electron transferring capability which is different from each other. This leads to the electrostatic induction of electrons to the electrode 120 causing the change in the triboelectric output voltage. Therefore, the concentration of the mercury ions of the target analyte solution can be obtained by measuring the value of the triboelectric output voltage. In FIG. 5, with increasing the concentration of the mercury ions, the triboelectric output voltage is decreased. The generated triboelectric output voltage of the sensing device is influenced by various parameters such as surface hydrophobicity, surface potential, work functions, etc., which further impact the electron transfer capability of the triboelectric sensing layer 130. The surface potential of the Tellurium nanostructures 132 without undergoing the chemical reaction with the mercury ions is about −570 mV; however, the surface potential of the Tellurium nanostructures 132 after undergoing the chemical reaction with 10 μM mercury ions is decreased to −50 mV.

Figure 6:
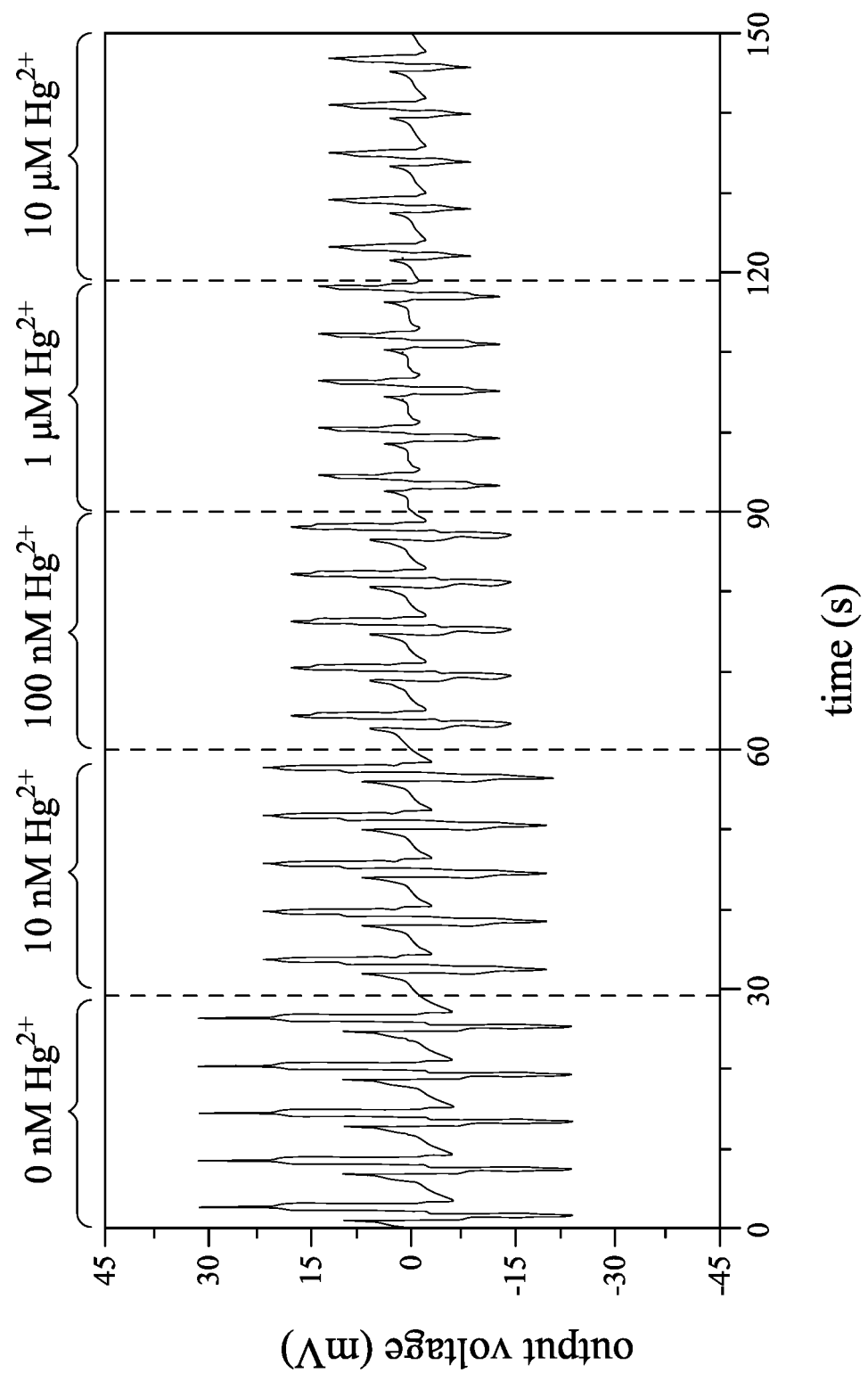
FIG. 6 shows another schematic view of the triboelectric output voltage of the sensing device according to the embodiment in FIG. 1 with the hydrophobic Tellurium nanostructures after contacting and separating from the deionized water.
Figure 7:
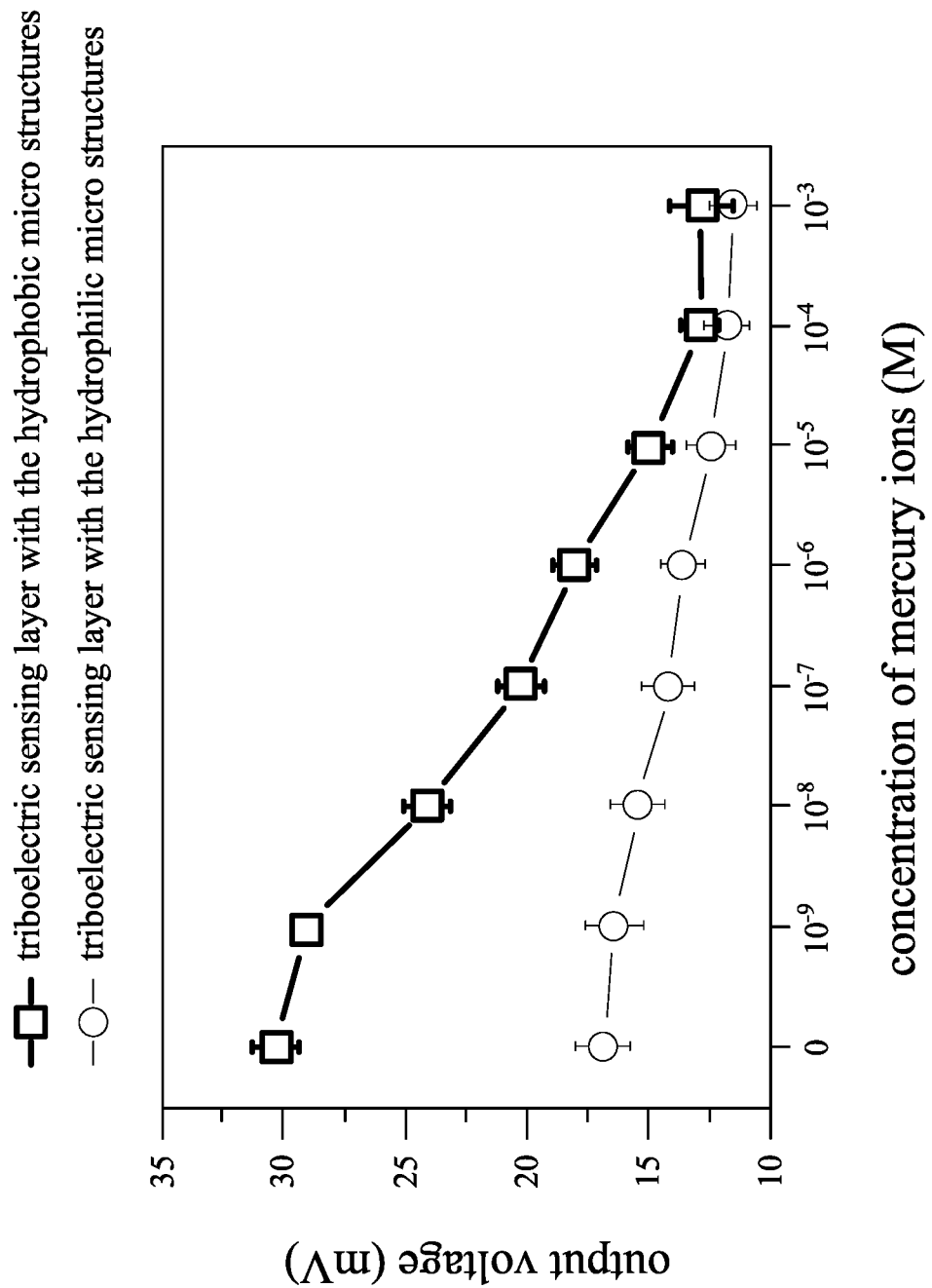
FIG. 7 shows a schematic view of comparison of the triboelectric output voltage of the sensing device with the hydrophobic and hydrophilic Tellurium nanostructures according to the embodiment in FIG. 1 after contacting and separating from the deionized water.

The Tellurium nanostructures 132 of the triboelectric sensing layer 130 can be hydrophilic or hydrophobic. Please refer to FIGS. 5 to 7. FIG. 6 shows another schematic view of the triboelectric output voltage of the sensing device 100 according to the embodiment in FIG. 1 with the hydrophobic Tellurium nanostructures 132 after contacting and separating from the deionized water 180. FIG. 7 shows a schematic view of comparison of the triboelectric output voltage of the sensing device 100 with the hydrophobic and hydrophilic Tellurium nanostructures 132 according to the embodiment in FIG. 1 after contacting and separating from the deionized water 180. In a time sequence of FIG. 6, the hydrophobic Tellurium nanostructures 132 undergo the chemical reaction with the mercury ions having different concentrations, and then are subjected to contact electrification with the deionized water 180 to generate the triboelectric output voltage. Similar to the hydrophilic Tellurium nanostructures 132, the triboelectric output voltage of the triboelectric sensing layer 130 with the hydrophobic Tellurium nanostructures 132 also is decreased with the increase in the concentration of mercury ions. However, as shown in FIG. 7, the change in the triboelectric output voltage is more obvious when hydrophobic Tellurium nanostructures 132 are used in the triboelectric sensing layer 130. In case of hydrophilic Tellurium nanostructures 132, the surface hydrophilicity is unchanged even after reaction with the mercury ions, which leads to retention of water molecules on the surface and hence the change in the triboelectric output voltage is not evident before and after reaction. On the other hand, the surfaces of the hydrophobic Tellurium nanostructures 132 eventually change to hydrophilic with the increase in the concentration of the mercury ions, which causes the higher change in the triboelectric output voltage signals after reaction with the mercury ions as shown in FIG. 7. By designing the Tellurium nanostructures 132 hydrophobic, the triboelectric sensing layer 130 can be water-proof, and the problem of incomplete separation of the surface of the triboelectric sensing layer 130 from liquids can be solved to achieve a significant changing of the triboelectric output voltage after Tellurium undergoing the chemical reaction with the mercury ions in order to improve the function of the sensing device 100. In the present embodiment, hydrophilicity and hydrophobicity of the Tellurium nanostructures 132 can be adjusted by reaction time and temperature, but the present disclosure is not limited to adjusting by reaction time and temperature.

Figure 8B:
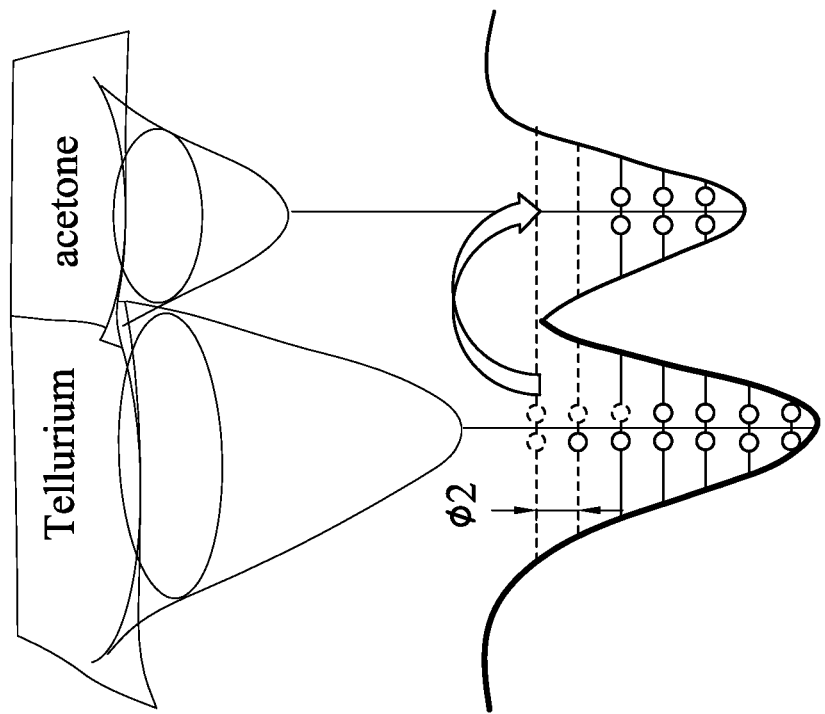
FIGS. 8A and 8B show a schematic view of a working principle of the sensing device according to the embodiment in FIG. 1 and acetone.
Figure 8A:
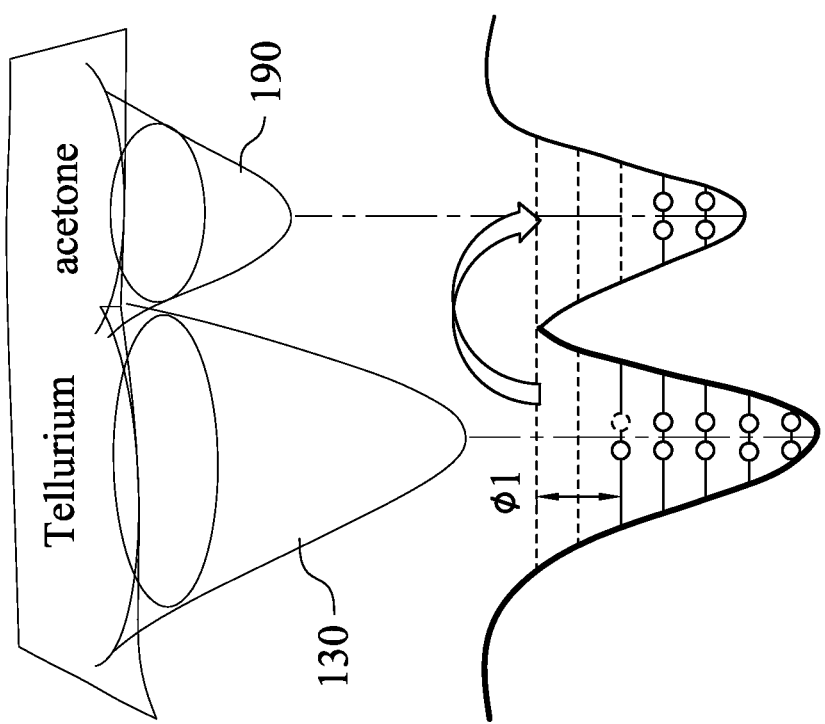
Figure 9:
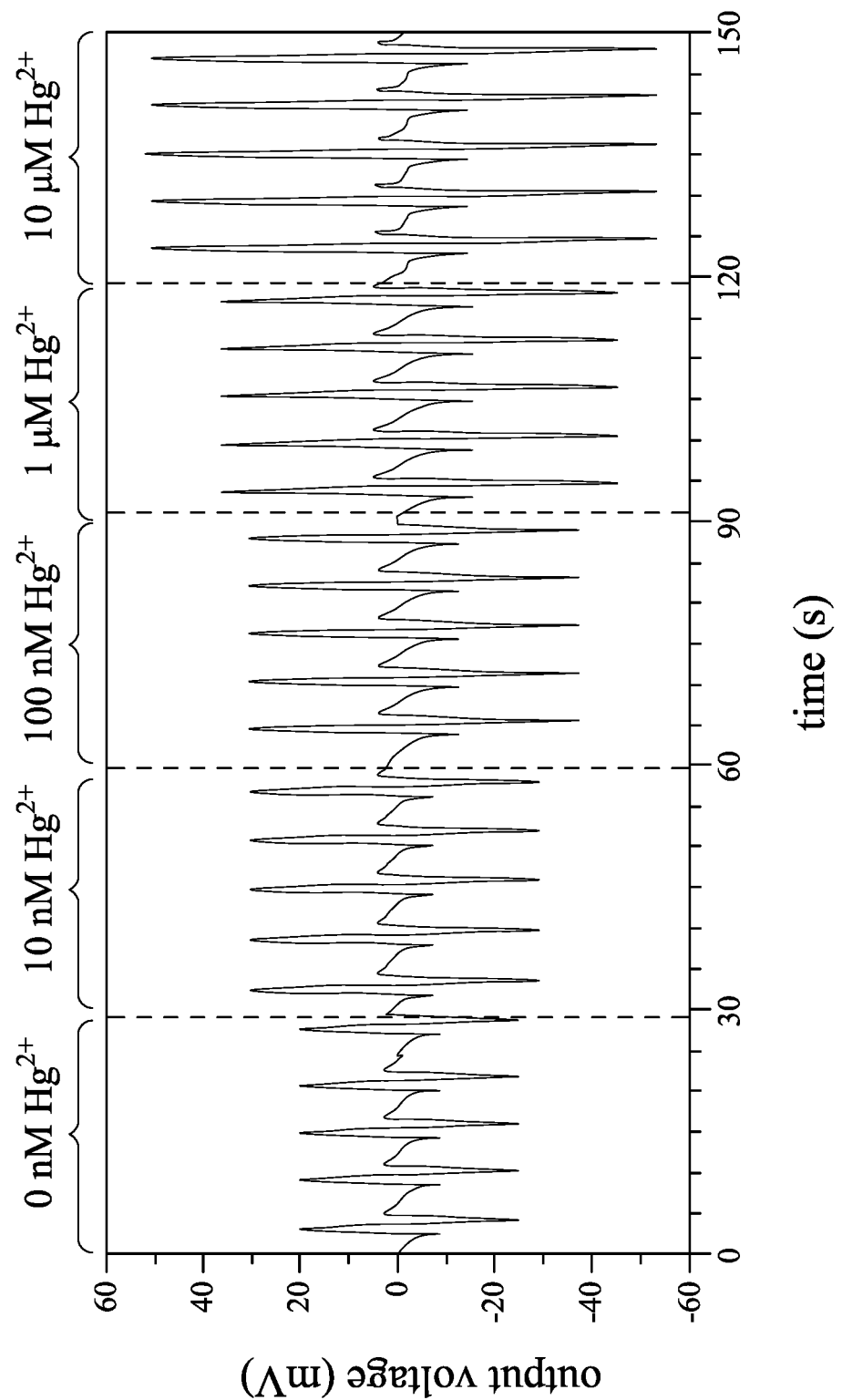
FIG. 9 shows the generated triboelectric output voltage of the sensing device according to the embodiment in FIG. 1 after contacting and separating from acetone.
Figure 10:
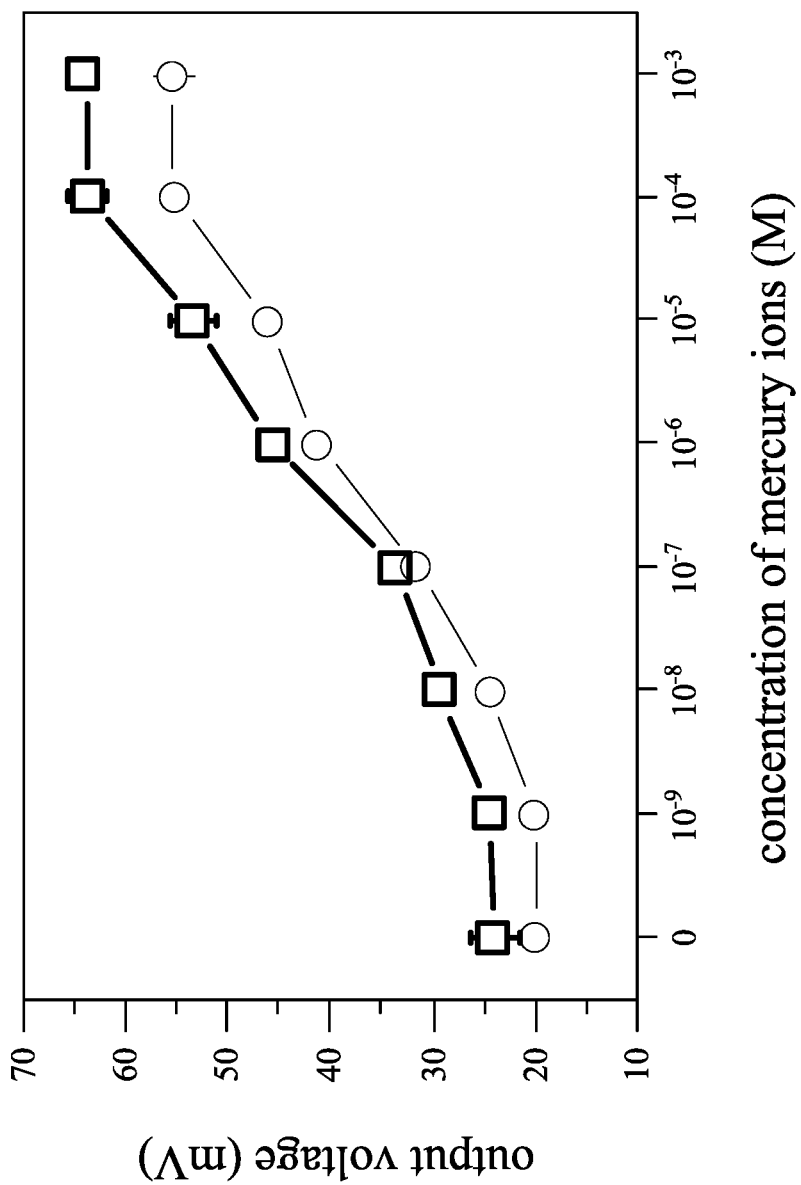
FIG. 10 shows the comparison of the triboelectric output voltage of the sensing device with the hydrophobic and hydrophilic Tellurium nanostructures according to the embodiment in FIG. 1 after contacting and separating from acetone.

The organic solvent such as acetone can be used instead of the deionized water 180 as the contact liquid to undergo contact electrification with the sensing device 100 to generate the triboelectric output voltage. FIGS. 8A and 8B show a schematic view of a working principle of the sensing device 100 according to the embodiment in FIG. 1 and acetone 190. FIG. 9 shows the generated triboelectric output voltage of the sensing device 100 according to the embodiment in FIG. 1 after contacting and separating from acetone 190. FIG. 10 shows the comparison of the triboelectric output voltage of the sensing device 100 with the hydrophobic and hydrophilic Tellurium nanostructures 132 according to the embodiment in FIG. 1 after contacting and separating from acetone 190. The energy level diagram displaying the electron transfer to acetone 190 before and after reaction of the Tellurium nanostructures 132 with the mercury ions is shown in FIG. 8A and FIG. 8B, respectively. The work function of the bare Tellurium nanostructures 132 before and after reaction with the mercury ions is denoted as being indicated as ϕ1 and ϕ2, respectively. The second work function ϕ2 is smaller than the first work function ϕ1, suggesting that the electrons can easily pass the energy barrier and result in higher charge transfer to acetone 190 after formation of mercury telluride. In a time sequence of FIG. 9, the Tellurium nanostructures 132 undergo the chemical reaction with the mercury ions with the different concentrations, and then contact and separate from acetone 190 to generate the triboelectric output voltage, and the concentrations of the mercury ions are 10 nM, 100 nM, 1 µM and 10 µM, respectively. With increasing the concentration of the mercury ions, the triboelectric output voltage is increased. Because of high volatility of acetone 190, whether the Tellurium nanostructures 132 are hydrophilic or hydrophobic, acetone 190 evaporates quickly from the triboelectric sensing layer 130 after the triboelectric sensing layer 130 separates from acetone 190. This property ensures complete separation of the liquid from the Tellurium nanostructures 132 which leads to increase of the triboelectric output voltage and decreases the effect of surface hydrophilicity and hydrophobicity of the Tellurium nanostructures 132 on the triboelectric output voltage. Unlike the deionized water 180, the triboelectric output voltage generated by the hydrophilic triboelectric sensing layer 130 is similar to the triboelectric output voltage generated by the hydrophobic triboelectric sensing layer 130 when acetone 190 is used as the contact liquid as shown in FIG. 10. By using the volatile organic solution as the contact liquid with triboelectric sensing layer 130 to generate the triboelectric output voltage, the effects of hydrophilicity and hydrophobicity of the Tellurium nanostructures 132 to the triboelectric output voltage can be reduced to achieve wide range of material usage.

Figures 11A, 11B, 11C, 11D:
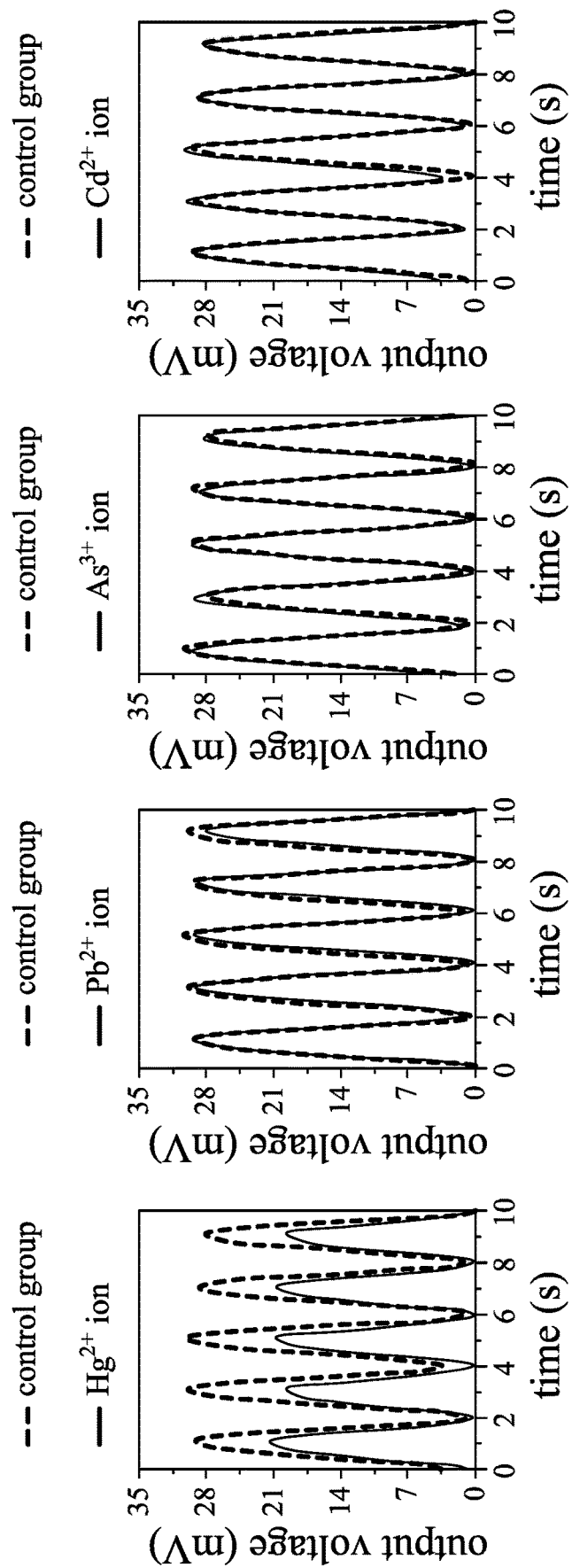
FIG. 11A shows a comparison of the triboelectric output voltage when the sensing device according to the embodiment in FIG. 1 undergoes contact electrification with a mercury ion solution and a control group.
FIG. 11B shows a comparison of the triboelectric output voltage when the sensing device according to the embodiment in FIG. 1 undergoes contact electrification with a lead ion solution and the control group.
FIG. 11C shows a comparison of the triboelectric output voltage when the sensing device according to the embodiment in FIG. 1 undergoes contact electrification with an arsenic ion solution and the control group.
FIG. 11D shows a comparison of the triboelectric output voltage when the sensing device according to the embodiment in FIG. 1 undergoes contact electrification with a cadmium ion solution and the control group.

Please refer to FIGS. 1 to 3 and FIGS. 11A to 11D. FIG. 11A shows a comparison of the triboelectric output voltage when the sensing device 100 according to the embodiment in FIG. 1 undergoes contact electrification with a mercury ion solution and a control group. FIG. 11B shows a comparison of the triboelectric output voltage when the sensing device 100 according to the embodiment in FIG. 1 undergoes contact electrification with a lead ion solution and the control group. FIG. 11C shows a comparison of the triboelectric output voltage when the sensing device 100 according to the embodiment in FIG. 1 undergoes contact electrification with an arsenic ion solution and the control group. FIG. 11D shows a comparison of the triboelectric output voltage when the sensing device 100 according to the embodiment in FIG. 1 undergoes contact electrification with a cadmium ion solution and the control group. In the sensing device 100 of FIG. 1, the electrodes 120 of the four robot fingers 112 can be electrically connected to the circuit board 140, respectively, so that the triboelectric output voltage of each of the electrode 120 can be transmitted to the user device 150 to obtain the triboelectric output voltage of each of the robot fingers 112 after contacting the target analyte solution. For example, in FIGS. 11A to 11D, the four robot fingers 112 contact the mercury ions ($Hg^{2+}$), lead ions ($Pb^{2+}$), arsenic ions ($As^{3+}$) and cadmium ions ($Cd^{2+}$), respectively, and each of the robot fingers 112 contacts the control deionized water to generate the triboelectric output voltages shown in FIGS. 11A to 11D. As shown in FIGS. 11A to 11D, the triboelectric output voltage of the robot finger 112 contacting the mercury ions is significantly decreased from the control group; however, the triboelectric output voltages of the robot fingers 112 contacting other metal ion solutions are not much different from the voltage generated by the control group. This is because of the highly selective nature of the Tellurium nanostructures 132 of the triboelectric sensing layer 130 attached to the robot finger 112 towards mercury ions.

Figure 12:
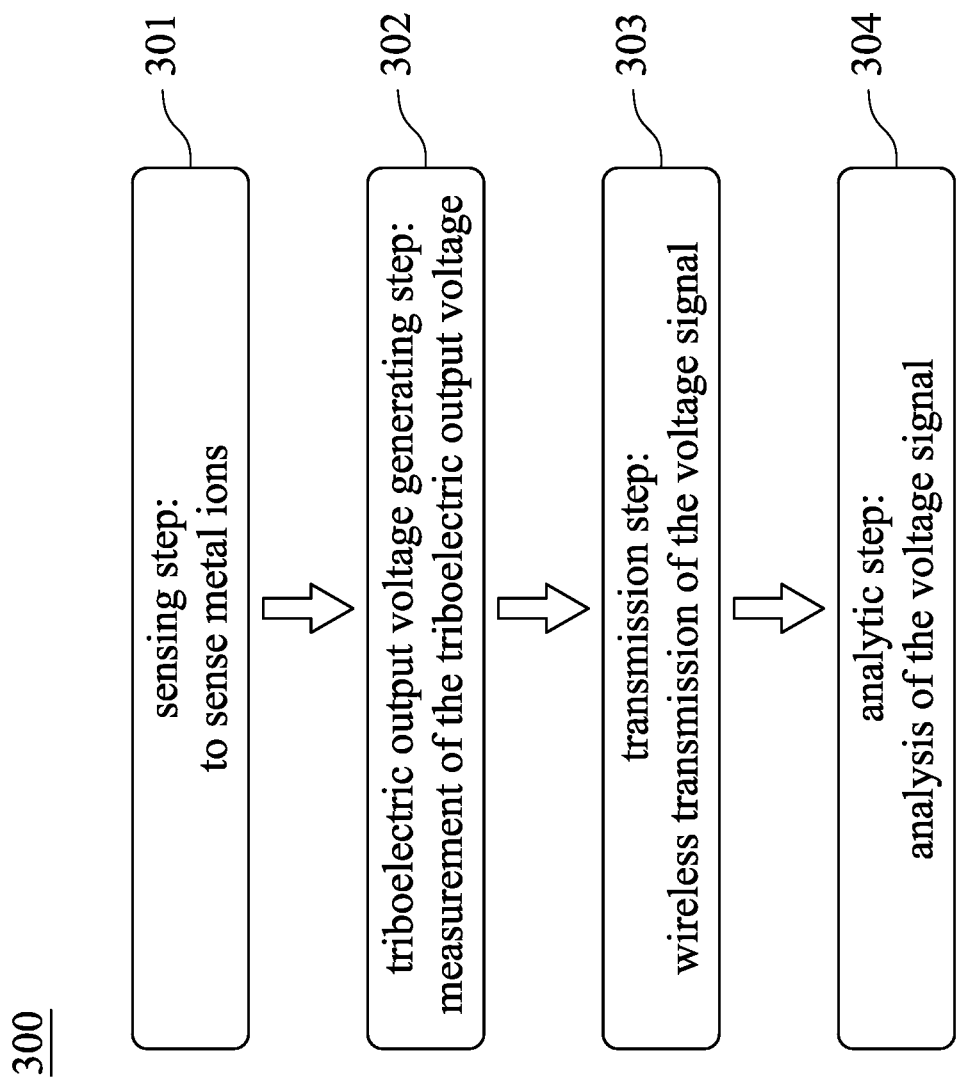
FIG. 12 shows a flow chart showing a sensing method according to another embodiment of the present disclosure.
Figure 13:
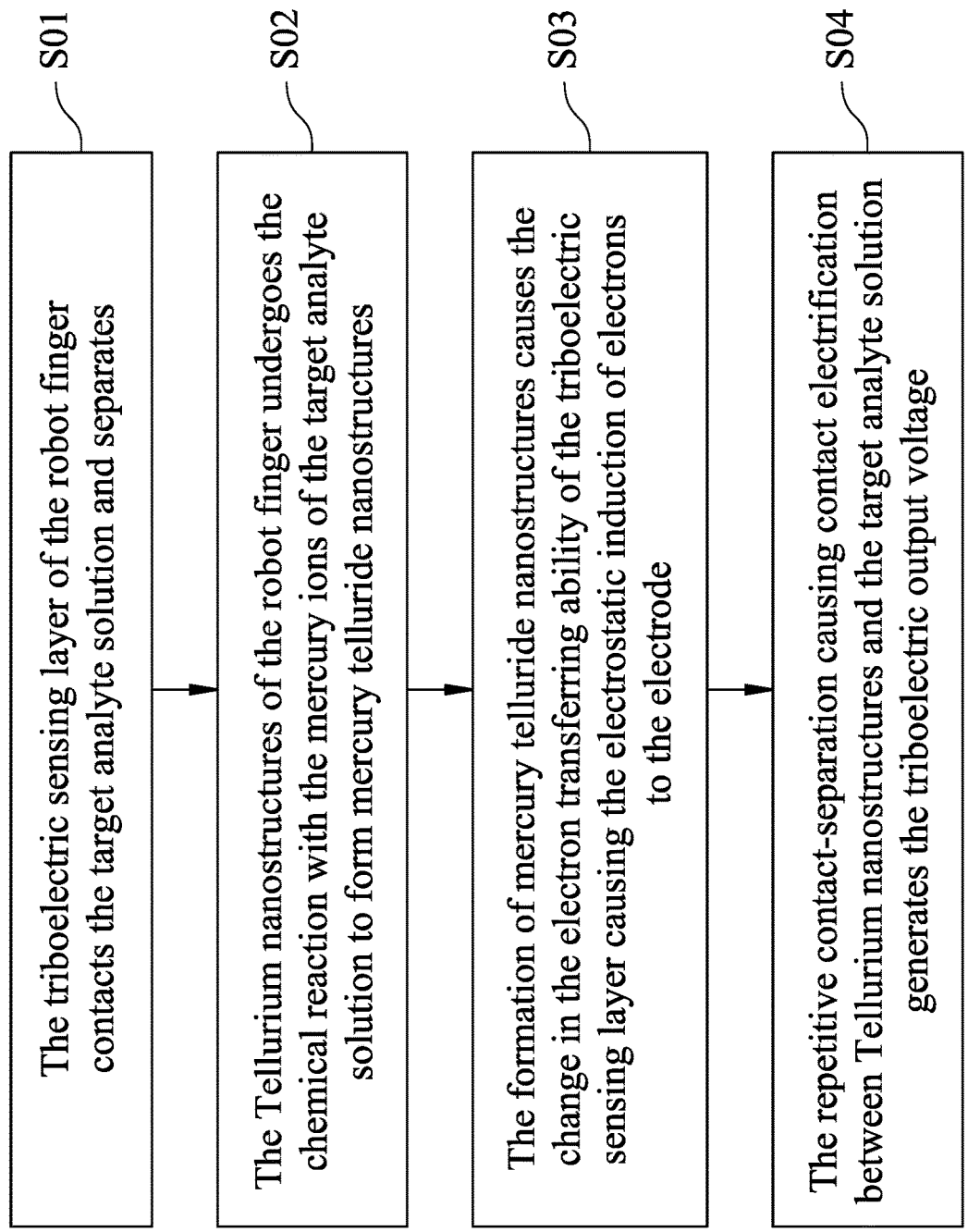
FIG. 13 shows a flow chart showing the detail of the sensing step and the triboelectric output voltage generating step of the sensing method according to an example of the embodiment in FIG. 12.
Figure 14:
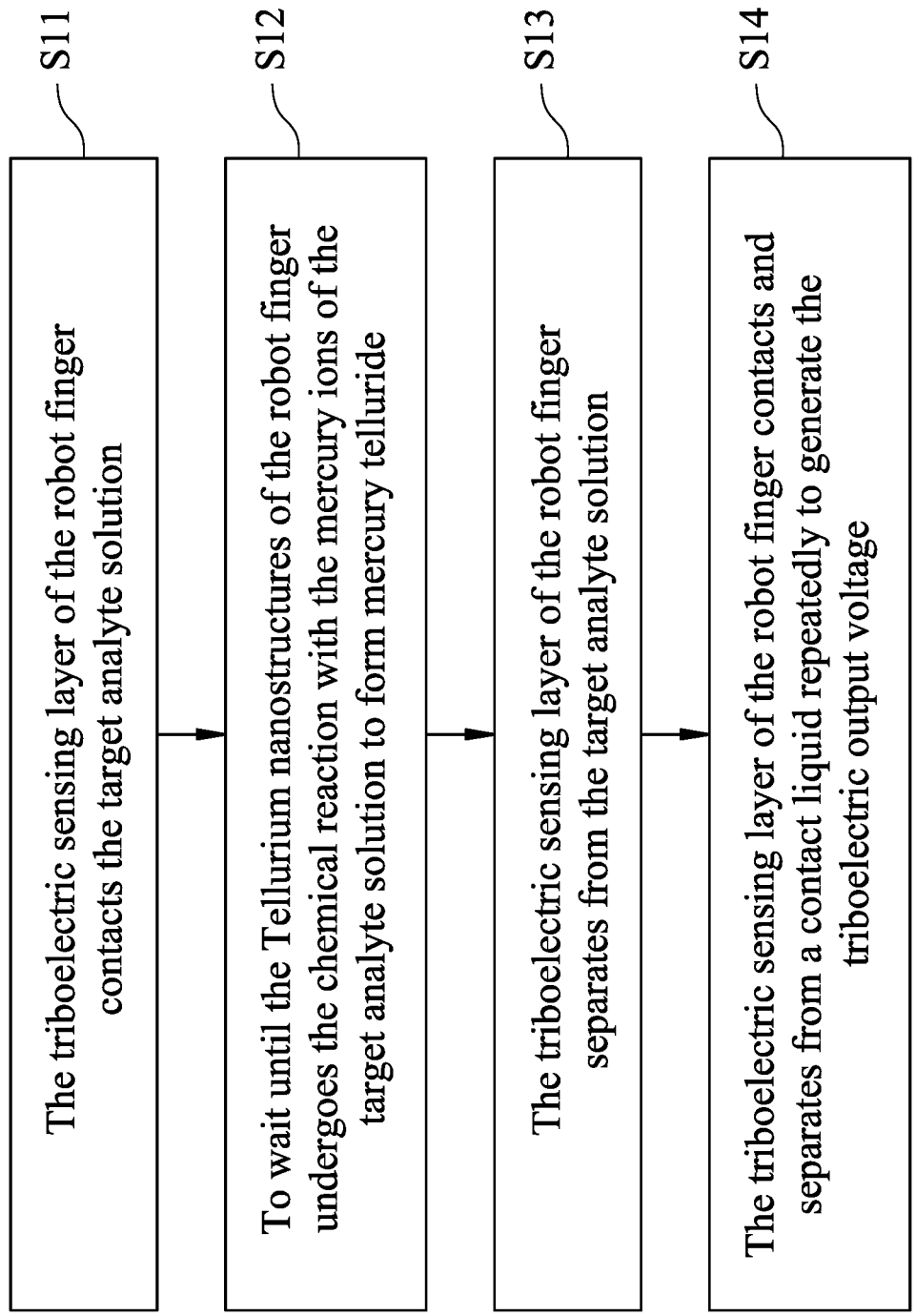
FIG. 14 shows a flow chart showing the detail of the sensing step and the triboelectric output voltage generating step of the sensing method according to the other example of the embodiment in FIG. 12.

FIG. 12 shows a flow chart showing a sensing method 300 according to another embodiment of the present disclosure. FIG. 13 shows a flow chart showing the detail of the sensing step 301 and the triboelectric output voltage generating step 302 of the sensing method 300 according to an example of the embodiment in FIG. 12. FIG. 14 shows a flow chart showing the detail of the sensing step 301 and the triboelectric output voltage generating step 302 of the sensing method 300 according to the other example of the embodiment in FIG. 12. As shown in FIGS. 12 to 14, the sensing method 300 includes the following steps: a sensing step 301, a triboelectric output voltage generating step 302, a transmission step 303 and an analytic step 304. The details of the sensing method 300 will be described with the sensing device 100 of FIGS. 1 to 3 in the following. The sensing step 301 is to sense metal ions; in the sensing step 301, at least one robot finger 112 contacts at least one target analyte solution, which results in binding of the metal ions to the surfaces of the Tellurium nanostructures 132 based on its selectivity. The Tellurium nanostructures 132 are highly selective towards mercury ions which upon reaction lead to the formation of mercury telluride. The triboelectric output voltage generating step 302 is a measurement of the triboelectric output voltage; in the triboelectric output voltage generating step 302, the triboelectric output voltage is generated by a contact electrification via contact and separation between the triboelectric sensing layer 130 attached to the robot finger 112 and the target analyte solution or between the triboelectric sensing layer 130 and the contact liquid after the triboelectric sensing layer 130 contacting and separating from the target analyte solution; in the triboelectric output voltage generating step 302, the contact-separation cycle leads to the contact electrification between the triboelectric sensing layer 130 attached to one robot finger 112 and the target analyte solution which causes electron transfer and hence generates the triboelectric output voltage. The triboelectric output voltage is provided for calculating a concentration of the mercury ions of the at least one target analyte solution. The triboelectric sensing layer 130 of the robot finger 112 has its intrinsic electron transferring capability, a part of the Tellurium nanostructures 132 of the robot finger 112 undergoes a chemical reaction with mercury ions of one target analyte solution to form mercury telluride nanostructures such that the electron transferring capability of the triboelectric sensing layer 130 is changed after contacting the target analyte solution.

In the example of FIG. 13, the triboelectric sensing layer 130 of the robot finger 112 contacts and then separates from the target analyte solution repeatedly to undergo the chemical reaction. In the step S01, the triboelectric sensing layer 130 of the robot finger 112 contacts the target analyte solution and separates. In step S02, the Tellurium nanostructures 132 of the robot finger 112 undergo the chemical reaction with the mercury ions of the target analyte solution to form mercury telluride nanostructures. In the step S03, the formation of mercury telluride nanostructures causes the change in the electron transferring ability of the triboelectric sensing layer 130 causing the electrostatic induction of electrons to the electrode 120. In the step S04, the repetitive contact-separation causing contact electrification between Tellurium nanostructures 132 of the triboelectric sensing layer 130 of the robot finger 112 and the target analyte solution combined with the electrostatic induction generates the triboelectric output voltage. Then the triboelectric sensing layer 130 of the robot finger 112 repeats the steps S01, S02, S03 until a chemical equilibrium of the chemical reaction of the Tellurium nanostructures 132 with the mercury ions is reached. Or, in the step S01, the triboelectric sensing layer 130 can contact and stand still on the target analyte solution, and then separates until the electron transferring capability of the standing triboelectric sensing layer 130 is altered with undergoing the chemical reaction in the step S02. Or, in the step S01, the triboelectric sensing layer 130 can contact and stand still in the target analyte solution for a while; in the step S02, the triboelectric sensing layer 130 separates from the target analyte solution and waits at other sides until the electron transferring capability of the triboelectric sensing layer 130 is altered with undergoing the chemical reaction, and then separates.

In the example of FIG. 14, the triboelectric sensing layer 130 of the robot finger 112 contacts and separates from the target analyte solution, and contacts and separates from a contact liquid to generate the triboelectric output voltage. In step S11, the triboelectric sensing layer 130 of the robot finger 112 contacts the target analyte solution. In the step S12, it is performed to wait until the Tellurium nanostructures 132 of the robot finger 112 undergo the chemical reaction with mercury ions of the target analyte solution to form mercury telluride. In the step S13, the triboelectric sensing layer 130 of the robot finger 112 separates from the target analyte solution. In the step S14, the triboelectric sensing layer 130 of the robot finger 112 contacts and then separates from the contact liquid repeatedly to generate the triboelectric output voltage. The contact liquids can be deionized water or an organic solvent such as acetone, ethanol, etc., but the present disclosure is not limited thereto.

In the transmission step 303, the transmission module 147 transmits the triboelectric output voltage to the user device 150. In the analytic step 304, a processor of the user device 150 compares the triboelectric output voltage with the voltage generated by the control group to calculate the concentration of the mercury ions of the at least one target analyte solution. The voltage of the control group generated by the contact electrification between the triboelectric sensing layer 130 and other contact liquids such as deionized water. In the present embodiment, the transmission module 147 is a wireless transmission module. In other embodiments, the processor of the user device can compare the triboelectric output voltage with the voltage generated by the control group to calculate the concentration of the mercury ions of the at least one target analyte solution, and then the calculated results are transmitted to the user device by the transmission module, but the present disclosure is not limited thereto.

Figure 15:
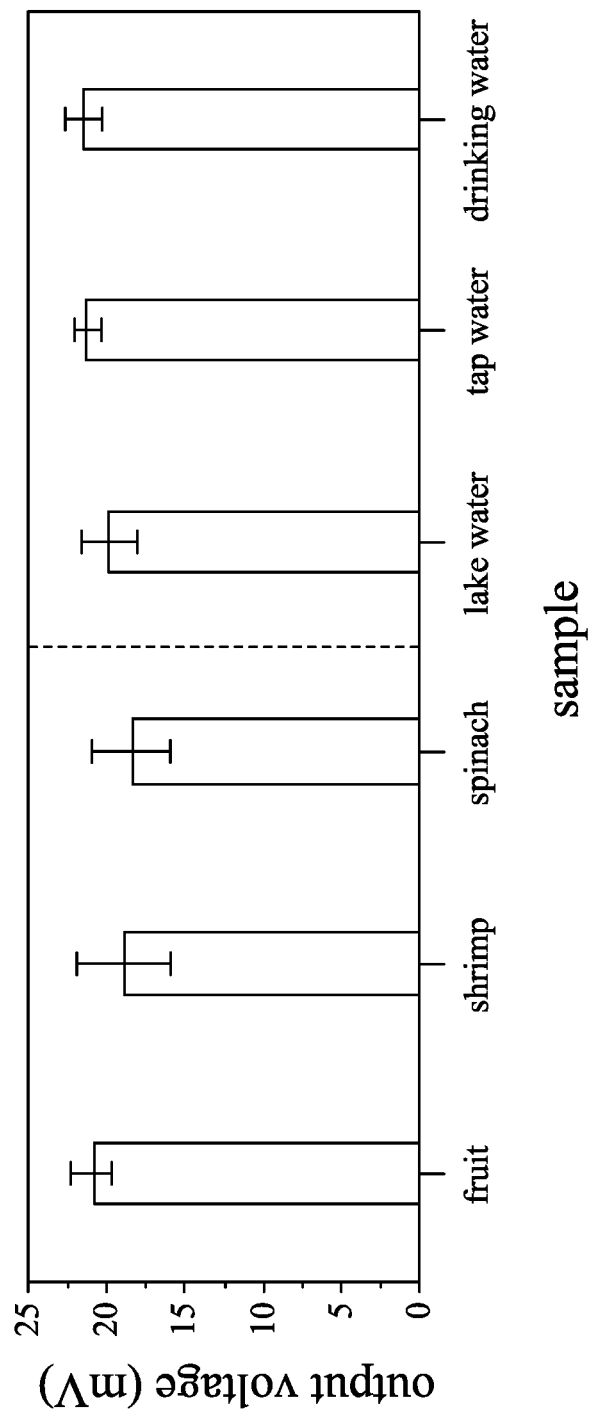
FIG. 15 shows the triboelectric output voltage measured by using the sensing method according to the embodiment in FIG. 12 while sensing mercury ions in real samples.

FIG. 15 shows the triboelectric output voltage measured by using the sensing method 300 according to the embodiment in FIG. 12 while sensing mercury ions in real samples. In the present embodiment, the mercury ion solution is spiked on the surface of the real samples such fruit, shrimp, spinach, etc., and the liquid such as lake water, tap water, drinking water, etc. The concentration of the mercury ions of each of the target analyte solutions is measured by the process in FIG. 13. By using the process in FIG. 13 to measure the target analyte solutions, the robot finger 112 can measure the concentration of the mercury ions of the target analyte solutions when contacting the target analyte solutions to simulate functions of contacting and sensing of a human, and the measurement can be done without undergoing the chemical reaction with the mercury ions first and then moved to other places so as to improve the efficiency of sensing and the immediacy.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A sensing method, comprising:
a sensing step, wherein at least one robot finger contacts at least one target analyte solution, an electrode is attached to the at least one robot finger, a triboelectric sensing layer is functionalized onto the electrode, the triboelectric sensing layer of the at least one robot finger comprises a plurality of nanostructures, each of the plurality of nanostructures comprises Tellurium, and a chemical reaction between a part of the plurality of nanostructures comprising the Tellurium attached to the at least one robot finger and mercury ions upon contact leads to formation of mercury telluride nanostructures which alter an electron transferring capability of the triboelectric sensing layer; and
a triboelectric output voltage generating step, wherein a triboelectric output voltage is generated by a contact electrification via contact and separation between the triboelectric sensing layer attached to the at least one robot finger and the at least one target analyte solution, or between the triboelectric sensing layer and a contact liquid after the triboelectric sensing layer contacting and separating from the at least one target analyte solution, the contact electrification combined with an electrostatic induction generates the triboelectric output voltage, and the triboelectric output voltage is provided for calculating a concentration of the mercury ions of the at least one target analyte solution;
wherein the sensing step and the triboelectric output voltage generating step are performed alternatively until a chemical equilibrium of the chemical reaction of the part of the plurality of nanostructures of the at least one robot finger with the mercury ions of the at least one target analyte solution is reached.

2. The sensing method of claim 1, further comprising: a transmission step, wherein a transmission module transmits the triboelectric output voltage to a user device; and an analytic step, wherein a processor of the user device compares the triboelectric output voltage with a voltage generated by a control group to calculate the concentration of the mercury ions of the at least one target analyte solution.

3. The sensing method of claim 2, wherein the transmission module is a wireless transmission module.

4. The sensing method of claim 1, wherein the contact liquid is a deionized water or an organic solvent.

5. The sensing method of claim 4, wherein the contact liquid is acetone.

6. The sensing method of claim 1, wherein, in the triboelectric output voltage generating step, the triboelectric sensing layer of the at least one robot finger contacts and then separates from the contact liquid repeatedly.

* * * * *